May 16, 1950 L. ZAIGER 2,508,056
WINDSHIELD WIPER
Filed Aug. 3, 1945 2 Sheets-Sheet 1
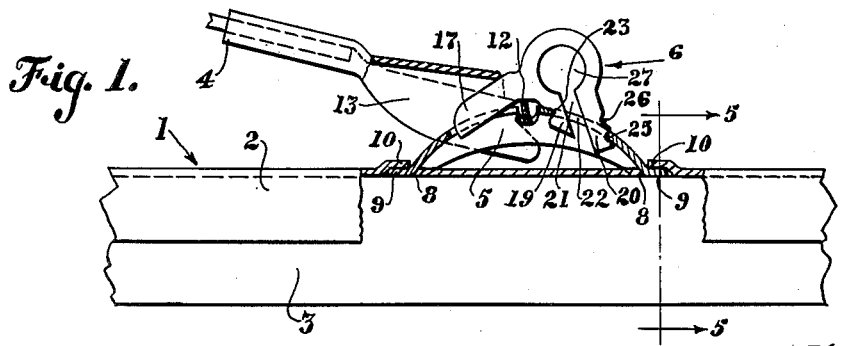
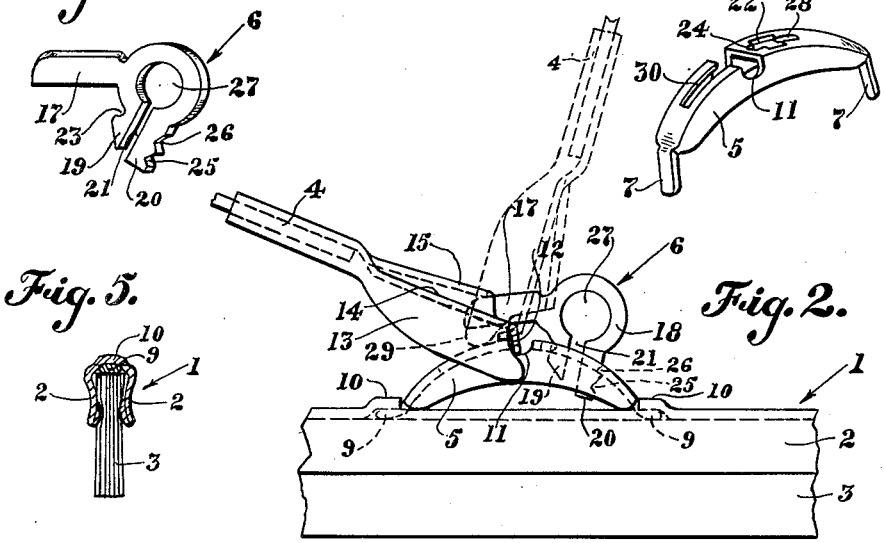
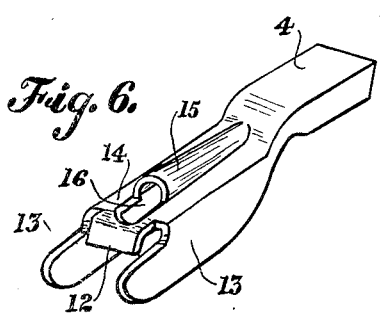
Inventor
Louis Zaiger
by Heard Smith & Tennant
Attorneys.

May 16, 1950 L. ZAIGER 2,508,056
WINDSHIELD WIPER
Filed Aug. 3, 1945 2 Sheets-Sheet 2
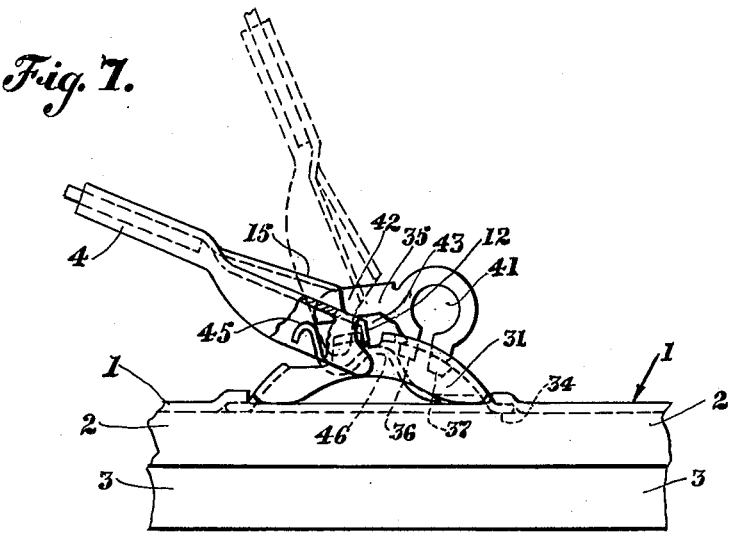
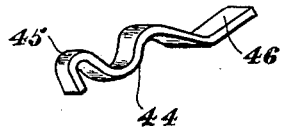
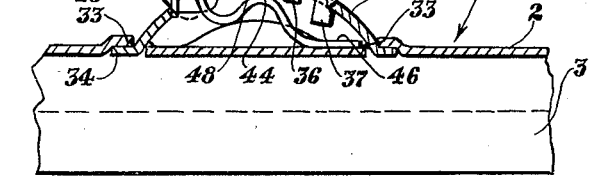
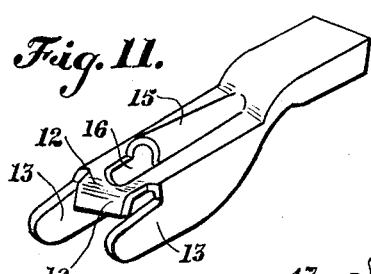
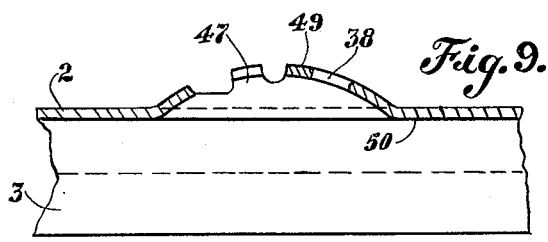
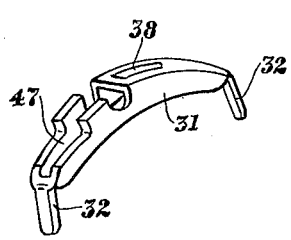
Inventor
Louis Zaiger
by Heard Smith & Tennant
Attorneys.

Patented May 16, 1950

2,508,056

UNITED STATES PATENT OFFICE 2,508,056

WINDSHIELD WIPER

Louis Zaiger, Swampscott, Mass.

Application August 3, 1945, Serial No. 608,722

7 Claims. (Cl. 15—250)

This invention relates to windshield wipers and particularly to the means for connecting the wiper blade to the wiper arm. One of the objects of the invention is to provide novel means for locking the windshield wiper to the wiper arm after the two parts have been assembled. The features wherein the invention resides will be more fully set forth and then pointed out in the appended claims.

In the drawings:

Fig. 1 is a fragmentary view partly in section showing a wiper blade embodying my invention.

Fig. 2 is a fragmentary view showing the manner in which the wiper arm is connected to the wiper blade.

Fig. 3 is a perspective view of the connector member.

Fig. 4 is a perspective view of the hold-down member.

Fig. 5 is a section on the line 5—5, Fig. 1.

Fig. 6 is a perspective view of the end of the wiper arm.

Fig. 7 is a view similar to Fig. 1, but showing a different embodiment of the invention.

Fig. 8 is a sectional view of the construction illustrated in Fig. 7, in which the manner of connecting the wiper arm to the wiper blade is illustrated.

Fig. 9 is a sectional view showing a modified form of the invention.

Fig. 10 is a perspective view of the locking element illustrated in Figs. 7 and 8.

Fig. 11 is a perspective view of the end of the wiper arm.

Fig. 12 is a perspective view of the connector member shown in Figs. 7 and 10.

I will first describe the form of the invention shown in Figs. 1–6.

In the drawings 1 indicates the wiper blade which may be of any suitable or usual construction and comprises a channel shaped holder or backing strip 2 and a flexible wiping member 3 retained in the holder. 4 indicates the wiper arm.

The wiper arm is connected to the blade 1 by means of a connector member 5 and a hold-down member 6. The connector member 5 is channel shaped in cross section and is also convexly curved from one end to the other. At each end the connecting member has an attaching finger 7 depending therefrom which is adapted to be inserted through an opening 8 in the back of the holder 1, ends 9 of the fingers 7 being bent or clinched over underneath the back of the holder 2 thereby rigidly securing the connector to the holder.

The portions 10 of the back of the holder immediately above the clinched over ends 9 of the fingers 7 are preferably upset slightly as best seen in Figs. 1 and 2 so that the clinched over fingers come flush with the under face of the holder. With this construction the bent over fingers do not present any obstacle on the inside of the holder which would interfere with the rubber wiping strip 3.

The connector 5 is provided with a transverse notch or recess 11 which is adapted to receive an attaching web 12 with which the wiper arm 4 is provided.

The free end of the wiper arm 4 is channel shaped and is provided with the two cheek pieces 13 between which the connector 5 is received. The channel shaped portion of the wiper arm is also provided with the transverse attaching web 12 as above described, said web having its width dimension extending at an angle to the length dimension of the arm.

The back 14 of the channel shaped portion of the wiper arm is upset as shown at 15 and is also provided with an opening 16 at the end of the upset portion, said opening being situated between the upset portion 15 and the attaching web 12.

When the wiper arm is assembled with the wiper blade, the connector member 5 is situated between cheek pieces 13 of the wiper arm and attaching web 12 is received in the notch 11 of the connector member. Said attaching web is retained in the notch 11 by means of the hold-down member 6 which is secured to the back of the connector 5 and is provided with the nose portion 17 adapted to overlie the attaching web 12 and retain it in the notch 11. The hold-down member 6 is formed with the body portion 18 from which extends two legs 19 and 20 that are spaced from each other as indicated at 21. These legs 19, 20 enter a slot 22 formed in the back of the connector 5. The leg 19 is formed on its outer edge with a notch 23 in which one end 24 of the slot 22 is received, and the leg 20 is provided on its outer edge with two notches 25, 26.

The hold-down member 6 is constructed to permit the legs to have a slight movement toward and from each other and for this purpose the body 18 of said hold-down member is provided with an aperture 27 which communicates with the space 21 between the legs. With this construction the body portion of the hold-down member is sufficiently resilient so that the legs can be moved toward each other slightly.

When the hold-down member is first assembled with the connector, the legs extend through the slot 22 with the end 24 of the slot engaging the notch 23 in the leg 19 and the end 28 of the slot engaging the notch 26 in the leg 20 as shown in Fig. 2. The resiliency of the body member and legs retain the hold-down member yieldingly in this position and when in such position, the nose 17 is spaced from the connector 5 to provide an entering throat 29 leading to the notch 11 and through which the attaching web 12 can be entered edgewise into said notch as illustrated in Fig. 2.

For assembling the arm with the wiper blade, the arm and wiper blade are brought into the relative positions shown by the dotted line position Fig. 2 and the attaching web is then inserted edgewise through the throat 29 during which operation the nose 17 enters the opening 16 of the wiper arm. When the wiper arm has been brought into a position in which the attaching web 12 is in register with the notch 11 then the wiper arm and wiper blade are moved relatively into their operative position shown in Fig. 1. During this movement, the upset portion 15 of the wiper arm engages the end of the nose 17 and applies a downward pressure thereon, thus causing the hold-down member to rock about the edge 24 of the slot 22 as a fulcrum into the position shown in Fig. 2 wherein the nose 17 locks the attaching web 12 in the notch 11. During this turning movement of the hold-down member the end 28 of the slot 22 will snap from the notch 26 into the notch 25, the resiliency of the legs 19, 20 permitting this operation.

If desired, the connector 5 may be provided with a slot 30 to receive the end of the nose 17 when it is in its operative position as shown in Fig. 1.

In the construction above described, which is shown in Figs. 1-6, the locking of the wiper blade to the wiper arm is secured by a pivoted or turning motion of the hold-down member. In Figs. 7-12 is illustrated an embodiment of the invention in which a resilient locking member is employed to lock the wiper arm to the windshield wiper.

Referring now to Figs. 7 and 8, the wiper arm 4 and the wiper blade 1 with its channel-shaped back member 2 and rubber wiping element 3 may be constructed as shown in Figs. 1 and 2, the wiper arm 4 being shown as formed with two cheek pieces 13 and with the transversely extending attaching web 12, and also being formed with the upset portion 15 and the opening 16 between said upset portion and the attaching web. The wiper blade is provided with the connector element 31 which is quite similar to the connector element 5 shown in Fig. 3, it having at each end attaching fingers 32 adapted to be inserted through openings 33 with which the channel-shaped backing strip 2 is provided.

The ends 34 of said fingers are bent over or clinched underneath the back of the backing strip as best seen in Fig. 8.

The body of the connector 31 is channel-shaped and it is also convexly curved from one end to the other. Mounted on the connector member 31 is a hold-down member 35 which is very similar to hold-down 17 shown in Figs. 1 and 2, except that hold-down member 35 is rigidly secured to the connector member and has no swinging movement relative thereto. The hold-down member 35 is formed with two legs, 36, 37, which extend through a slot 38 formed in the connector member, the leg 36 being provided on its outer edge with a notch 39 in which one end of the slot 38 is engaged and the other leg 37 being formed on its outer face with a notch 40 in which the other end of the slot 38 is received. The body of the hold-down member is formed with a central opening 41 and the construction is such that when the legs 36, 37 are introduced through the slot 38 they will be held under slight tension, which will retain the ends of the slot 38 in the notches 39—40, and will thus rigidly secure the hold-down member to the connector member. It will be understood that the slot 38 has a width corresponding to the thickness of the legs 36, 37, so that said legs tightly fit the slot.

The nose portion 42 on the hold-down member forms with the top of the connector member a passage or throat 43, adapted to receive the attaching web 12 of the wiper arm, and a locking member is provided for locking said web in said throat or passage 43 after the members have been assembled. This locking member is indicated at 44 and is in the form of a strip of spring metal, one end 45 of which is bent upwardly and then downwardly as shown in the drawings, to provide a gate portion adapted to close the open end of the throat or passage 43.

The end 46 of said resilient locking member is spot-welded or otherwise rigidly attached to the back of the backing strip 2, and the shape of the locking member is such that normally the gate portion 45 thereof extends upwardly through the slot 47 with which the connector member 31 is provided and closes the open end of the passage 43, as illustrated in Fig. 7. The resiliency of the locking member 44 permits the gate portion 45 thereof to be depressed into a position which opens the throat or passage 43 sufficiently to permit the attaching web 12 to be inserted therein.

In assembling the wiper blade and wiper arm the members may be placed in the relative position shown in Fig. 7, with the edge of the attaching web bearing against the gate portion 45 of the locking member. A downward pressure on the wiper arm, or, conversely, an upward pressure on the wiper blade, will cause the attaching web 12 to bear against the gate portion of the locking member with sufficient force to bend said locking member downwardly, thereby to open the passage 43 at which time the attaching web may be entered into said passage and underneath the hold-down member 35. As soon as the attaching web has been moved into the passage 43, the resiliency of the locking member 44 will cause the gate portion 45 thereof to move upwardly into a position closing the open end of said passage, thereby locking the wiper blade to the wiper arm. If desired, the connector member 31 may be provided with a transverse recess 48 in which the edge of the attaching web is received when the parts are fully assembled. The presence of this recess 48, however, is not necessary because the locking member will retain the attaching web in the throat 43 even though there is no recess provided.

In Fig. 9 is shown a construction in which the connector member is made integral with the backing strip of the wiper blade. In this construction the back edge of the wiper blade is deformed to present the bumped-up portion 49 which has a shape corresponding to that of the connector 31. Such struck-up portion 49 is provided with a slot 38 to receive the hold-down member 35 and also with a slot 47 through which the locking member may project.

This embodiment of the invention may be used either with the locking means such as is shown in Figs. 1 and 2 in which the hold-down member is mounted in the slot 22 for turning movement, or it may be used in the form of the invention shown in Figs. 7 and 8 in which the resilient locking member 44 is provided. Where the resilient locking member 44 is employed in connection with the construction shown in Fig. 9, the end 46 of said locking member may be spot-welded to the backing strip at the point 50 in Fig. 9.

I claim:

1. A windshield wiper comprising a blade member, a connector member mounted thereon, a wiper arm having a channel-shaped outer end adapted to straddle the connector member and also provided with a transverse web portion, the back of the channel-shaped portion of the wiper arm being provided with an opening immediately in the rear of the web portion and the portion of said back immediately in the rear of said opening being upset to provide a groove on the inside of the back which extends rearwardly from said opening, a hold-down member carried by the connector member and having a portion which forms with the connector member an open-ended throat adapted to receive said web, said portion of the hold-down member extending through said opening when the blade and arm are assembled, and means including said portion of the hold-down member to close the open end of the throat, thereby to lock the transverse web portion in said throat.

2. A windshield wiper comprising a blade member, a connector member mounted thereon and provided with a notch in its back, a wiper arm having a channel-shaped outer end adapted to straddle the connector member and also provided with a transverse web portion to engage in said notch, the back of the channel-shaped portion of the wiper arm being provided with an opening immediately in the rear of the attaching web and the portion of said back immediately in the rear of said opening being upset to provide a groove on the underside of the back which extends rearwardly from said opening, and a hold-down member carried by the connector member and having a nose portion extending over said web portion and through said opening and into said groove, said hold-down member serving to hold the transverse web portion in said notch.

3. A windshield wiper comprising a blade member, a connector member mounted thereon and provided with a notch in its back, a wiper arm having a channel-shaped outer end adapted to straddle the connector member and also provided with a transverse web portion to engage in said notch, the back of the channel-shaped portion of the wiper arm being provided with an opening immediately in the rear of the attaching web and the portion of said back immediately in the rear of said opening being upset to provide a groove on the under side of the back which extends rearwardly from said opening, a hold-down member carried by the connector member and having a nose portion, said nose portion forming with the connector member an open-ended throat through which said web portion may be introduced into the notch, said nose portion of the hold-down member extending through said opening and into said groove when the blade and arm are assembled, and means including said nose portion to close the open end of the throat thereby to lock the transverse web portion in said notch.

4. A windshield wiper comprising a blade member, a connector member mounted thereon and provided with a notch in its back, a wiper arm having a channel-shaped outer end adapted to straddle the connector member and also provided with a transverse web portion to engage in said notch, the back of the channel-shaped portion of the wiper arm being provided with an opening immediately in the rear of the attaching web and the portion of said back immediately in the rear of said opening being upset to provide a groove on the under side of the back which extends rearwardly from said opening, and a hold-down member movably carried by the connector member and provided with a nose portion which in one position of the hold-down member forms with the connector member an open-ended throat through which the attaching web may be entered edgewise into said notch, during which operation said nose portion passes into and through said opening, and which in another position closes said throat thereby locking the web in said notch, the nose portion of the hold-down member occupying said groove when the wiper arm and wiper blade are in their relative operative positions.

5. A windshield wiper comprising a blade member, a connector member mounted thereon, a wiper arm having a channel-shaped outer end adapted to straddle the connector member and also having a transverse web portion, the back of the channel-shaped portion of the wiper arm being provided with an opening immediately in the rear of the web portion and the portion of said back immediately in the rear of said opening being upset to provide a groove on the under side of said back which extends rearwardly from said opening, a hold-down member carried by the connector member and having a portion which forms with the connector member an open-ended throat in which the transverse web portion is received, and a resiliently mounted gate for closing said throat and locking the transverse web therein.

6. A windshield wiper comprising a blade member having a channel holder and a flexible wiping element retained therein, said holder having two apertures in its back, a connector member U-shaped in cross section and having a finger at each end, said fingers extending through said apertures and being clinched under the back of the holder, said connecting member having a notch in its outer face, a wiper arm having a channel shape at its outer end and adapted to straddle the connector member and also provided with a transverse web portion to engage in said notch, the back of the channel-shaped outer end of the wiper arm being provided with an opening in the rear of said web, and a hold-down member carried by the connector member and provided with a nose portion extending over the attaching web and through said opening.

7. A windshield wiper comprising a blade member, a channel shaped connector member mounted thereon and having an inverted U-shape in vertical cross section, said connector member having a slot in its upper surface, a wiper arm having a channel shaped outer end adapted to straddle the connector member and also provided with a transverse web portion, a hold-down member having legs extending through and retained in said slot of the connector member, said hold-down member having a portion which forms with the connector member an open-ended throat to receive said transverse web portion, and a resiliently mounted gate for closing said throat and retaining the web portion therein.

LOUIS ZAIGER.

REFERENCES CITED

The following references are of record in the file of this patent:

UNITED STATES PATENTS

| Number | Name | Date |
|---|---|---|
| 2,102,188 | Romano | Dec. 14, 1937 |
| 2,147,113 | Smulski | Feb. 14, 1939 |
| 2,156,506 | Marcolivio | May 2, 1939 |
| 2,295,011 | Rodrick | Sept. 8, 1942 |